United States Patent
Garrow et al.

(10) Patent No.: US 12,462,072 B2
(45) Date of Patent: Nov. 4, 2025

(54) SYSTEMS AND METHODS FOR SURVEYING A MANUFACTURING ENVIRONMENT

(71) Applicant: Ford Motor Company, Dearborn, MI (US)

(72) Inventors: Sarah Garrow, Detroit, MI (US); Shankar Narayan Mohan, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 1053 days.

(21) Appl. No.: 17/484,153

(22) Filed: Sep. 24, 2021

(65) Prior Publication Data

US 2023/0100699 A1 Mar. 30, 2023

(51) Int. Cl.
*G06F 30/13* (2020.01)
*G05B 19/418* (2006.01)
(Continued)

(52) U.S. Cl.
CPC ......... *G06F 30/13* (2020.01); *G05B 19/4185* (2013.01); *G05B 19/41885* (2013.01);
(Continued)

(58) Field of Classification Search
None
See application file for complete search history.

(56) References Cited

U.S. PATENT DOCUMENTS

| 10,317,905 B2 | 6/2019 | Ouellette et al. |
| 11,119,496 B1 * | 9/2021 | Ebrahimi Afrouzi ....................... G05D 1/0274 |

(Continued)

FOREIGN PATENT DOCUMENTS

| CN | 112636345 A * | 4/2021 | ............ B60L 53/62 |
| WO | WO-2021038437 A1 * | 3/2021 | ........... B65G 1/0464 |

OTHER PUBLICATIONS

Subelj, Lovro, Label Propagation for clustering [online] Sep. 17, 2017 [retrieved Sep. 27, 2024] <URL:https://arxiv.org/abs/1709.05634 > (Year: 2017).*

(Continued)

*Primary Examiner* — Emerson C Puente
*Assistant Examiner* — Michael Paul Mirabito
(74) *Attorney, Agent, or Firm* — Burris Law, PLLC (57) ABSTRACT

A method for surveying an environment includes segmenting a plurality of nodes into a plurality of communities. The method includes identifying a plurality of community centroids based on the plurality of communities, where each community centroid from among the plurality of community centroids is associated with one community from among the plurality of communities. The method includes determining, for each community centroid from among the plurality of community centroids, a community type of the community centroid, where the community type is one of a primary type and an auxiliary type, and where the community type is based on a distance between the community centroid and one or more charging stations. The method includes generating a plurality of intercommunity routes based on the plurality of community centroids, the one or more charging stations, the community type, and one or more performance constraints.

20 Claims, 9 Drawing Sheets

(51) Int. Cl.
*G05D 1/00* (2024.01)
*G06F 18/20* (2023.01)
*G06F 18/2113* (2023.01)
*G06F 18/22* (2023.01)
*G06F 18/2413* (2023.01)
*G06V 20/17* (2022.01)
*G06V 20/52* (2022.01)
*G06V 20/56* (2022.01)

(52) U.S. Cl.
CPC .......... *G06F 18/22* (2023.01); *G06F 18/2414* (2023.01); *G06F 18/29* (2023.01); *G06V 20/17* (2022.01); *G06V 20/52* (2022.01); *G06V 20/56* (2022.01); *G05B 2219/23456* (2013.01); *G05D 1/00* (2013.01); *G06F 18/2113* (2023.01)

(56) References Cited

U.S. PATENT DOCUMENTS

| | | |
|---|---|---|
| 2019/0369641 A1 | 12/2019 | Gillett |
| 2020/0012284 A1 | 1/2020 | Morita et al. |
| 2020/0041560 A1 | 2/2020 | Schwartz et al. |
| 2022/0026890 A1 | 1/2022 | Mohan et al. |

OTHER PUBLICATIONS

Chen, Deploying Robots and Drones in Process Plants and Facilities, Control Engineering, pp. 1-10, Feb. 5, 2020.

* cited by examiner

SYSTEMS AND METHODS FOR SURVEYING A MANUFACTURING ENVIRONMENT

FIELD

The present disclosure relates to systems and methods for surveying a manufacturing environment.

BACKGROUND

The statements in this section merely provide background information related to the present disclosure and may not constitute prior art.

A digital twin provides a virtual model of components and/or existing conditions of an environment. To generate the digital twin, an operator may traverse the environment with sensing systems (e.g., cameras and/or light detection and ranging (LIDAR) sensors) to capture scene information at each location of the environment. Once captured, the operator processes the data to stitch together individual areas to construct the digital twin. As another example, robotic systems equipped with sensing systems may traverse the environment to capture the scene information.

However, dynamic changes to the layout and conditions of the environment may compromise the accuracy of the digital model. Furthermore, obstacles of the environment may inhibit the robot from traversing the environment and accurately collecting the scene information to generate the digital twin. These issues with generating digital twins, among other issues, are addressed by the present disclosure.

SUMMARY

This section provides a general summary of the disclosure and is not a comprehensive disclosure of its full scope or all of its features.

A method for surveying an environment includes segmenting a plurality of nodes into a plurality of communities, where each node from among the plurality of nodes corresponds to a location of the environment, and where each community from among the plurality of communities includes a set of nodes from among the plurality of nodes. The method includes identifying a plurality of community centroids based on the plurality of communities, where each community centroid from among the plurality of community centroids is associated with one community from among the plurality of communities. The method includes determining, for each community centroid from among the plurality of community centroids, a community type of the community centroid, where the community type is one of a primary type and an auxiliary type, and where the community type is based on a distance between the community centroid and one or more charging stations. The method includes generating a plurality of intercommunity routes based on the plurality of community centroids, the one or more charging stations, the community type, and one or more performance constraints.

In one form, the method further includes segmenting the plurality of nodes into the plurality of community centroids and the plurality of communities based on an asynchronous label propagation routine. In one form, the method further includes connecting the plurality of nodes via a plurality of edges based on one or more edge constraints. In one form, the one or more edge constraints are based on a threshold travel distance, a radial distance associated with each node of the plurality of nodes, and one or more traversability scores indicating a traversability of one or more locations of the environment corresponding to the plurality of nodes. In one form, the method further includes segmenting the plurality of nodes into the plurality of communities based on the plurality of edges.

In one form, the method further includes selecting a first charging station and a second charging station from among the one or more charging stations, determining a first distance between the first charging station and the community centroid, and determining a second distance between the second charging station and the community centroid, where the community type of the community centroid is further based on a ratio between the first distance and the second distance. In one form, the method further includes determining one or more additional distances between the community centroid and one or more additional charging stations from among the one or more charging stations and selecting the first charging station and the second charging station when the one or more additional distances are greater than the first distance and the second distance.

In one form, generating the plurality of intercommunity routes based on the plurality of community centroids, the one or more charging stations, the community type, and the one or more performance constraints further includes: selecting a first charging station from among the one or more charging stations, selecting a first set of community centroids from among the plurality of community centroids, where each community centroid from among the first set of community centroids is the primary type, and where a distance between the first set of community centroids and the first charging station is less than a distance between the first set of community centroids and a second charging station from among the one or more charging stations; selecting a first community centroid from among the first set of community centroids, where a distance between the first community centroid and the first charging station is greater than a distance between each remaining community centroid of the first set of community centroids and the first charging station; and assigning the first community centroid to a first intercommunity route from among the plurality of intercommunity routes when an energy consumption of the first community centroid and an intracommunity time of the first community centroid satisfy the one or more performance constraints. In one form, the method further includes selecting a second community centroid from among the first set of community centroids, assigning the second community centroid to the first intercommunity route when an energy consumption of the second community centroid, an intracommunity time of the second community centroid, and an intercommunity time of the first community centroid and the second community centroid satisfy the one or more performance constraints, and assigning the second community centroid to a second intercommunity route from among the plurality of intercommunity routes when at least one of the energy consumption of the second community centroid, the intracommunity time of the second community centroid, and the intercommunity time of the first community centroid and the second community centroid do not satisfy the one or more performance constraints. In one form, the first intercommunity route originates from the first charging station.

In one form, the method further includes selectively assigning an auxiliary set of community centroids from among the plurality of community centroids to the plurality of intercommunity routes, where each community centroid from among the auxiliary set of community centroids is the auxiliary type. In one form, selectively assigning the auxiliary set of community centroids from among the plurality of community centroids to the plurality of intercommunity routes further includes, for each community centroid from among the auxiliary set of community centroids: determining whether one or more intercommunity routes from among the plurality of intercommunity routes are available based on an energy consumption of the community centroid, an intracommunity time of the community centroid, and an intercommunity time of the community centroid, and in response to the one or more intercommunity routes being available, assigning the community centroid to a given intercommunity route from among the one or more intercommunity routes based on a distance between the community centroid and the one or more intercommunity routes. In one form, the method further includes generating an additional route based on the community centroid and the one or more charging stations in response to the one or more intercommunity routes not being available.

The present disclosure provides a system for surveying an environment including a processor and a nontransitory computer-readable medium including instructions that are executable by the processor. The instructions include segmenting a plurality of nodes into a plurality of communities, where each node from among the plurality of nodes corresponds to a location of the environment, and where each community from among the plurality of communities includes a set of nodes from among the plurality of nodes. The instructions include identifying a plurality of community centroids based on the plurality of communities, where each community centroid from among the plurality of community centroids is associated with one community from among the plurality of communities. The instructions include determining, for each community centroid from among the plurality of community centroids, a community type of the community centroid, where the community type is one of a primary type and an auxiliary type, and where the community type is based on a distance between the community centroid and one or more charging stations. The instructions include generating a plurality of intercommunity routes based on the plurality of community centroids, the one or more charging stations, the community type, and one or more performance constraints.

In one form, the instructions include selecting a first charging station and a second charging station from among the one or more charging stations, determining a first distance between the first charging station and the community centroid, and determining a second distance between the second charging station and the community centroid, where the community type of the community centroid is further based on a ratio between the first distance and the second distance.

In one form, the instructions for generating the plurality of intercommunity routes based on the plurality of community centroids, the one or more charging stations, the community type, and the one or more performance constraints further include: selecting a first charging station from among the one or more charging stations, selecting a first set of community centroids from among the plurality of community centroids, where each community centroid from among the first set of community centroids is the primary type, and where a distance between the first set of community centroids and the first charging station is less than a distance between the first set of community centroids and a second charging station from among the one or more charging stations; selecting a first community centroid from among the first set of community centroids, where a distance between the first community centroid and the first charging station is greater than a distance between each remaining community centroid of the first set of community centroids and the first charging station; and assigning the first community centroid to a first intercommunity route from among the plurality of intercommunity routes when an energy consumption of the first community centroid and an intracommunity time of the first community centroid satisfy the one or more performance constraints. In one form, the instructions further include selecting a second community centroid from among the first set of community centroids, assigning the second community centroid to the first intercommunity route when an energy consumption of the second community centroid, an intracommunity time of the second community centroid, and an intercommunity time of the first community centroid and the second community centroid satisfy the one or more performance constraints, and assigning the second community centroid to a second intercommunity route from among the plurality of intercommunity routes when at least one of the energy consumption of the second community centroid, the intracommunity time of the second community centroid, and the intercommunity time of the first community centroid and the second community centroid do not satisfy the one or more performance constraints.

In one form, the instructions further include selectively assigning an auxiliary set of community centroids from among the plurality of community centroids to the plurality of intercommunity routes, where each community centroid from among the auxiliary set of community centroids is the auxiliary type. In one form, the instructions for selectively assigning the auxiliary set of community centroids from among the plurality of community centroids to the plurality of intercommunity routes further include, for each community centroid from among the auxiliary set of community centroids: determining whether one or more intercommunity routes from among the plurality of intercommunity routes are available based on an energy consumption of the community centroid, an intracommunity time of the community centroid, and an intercommunity time of the community centroid, and in response to the one or more intercommunity routes being available, assigning the community centroid to a given intercommunity route from among the one or more intercommunity routes based on a distance between the community centroid and the one or more intercommunity routes. In one form, the instructions further include generating an additional route based on the community centroid and the one or more charging stations in response to the one or more intercommunity routes not being available.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a survey system that performs a bi-level routing problem for efficiently surveying an environment using a carrier robot and a drone. Specifically, the survey system is configured to partition one or more nodes representing various points of interests of the environment based on an asynchronous label propagation routine. The survey system then assigns the detected communities of nodes to a generated intercommunity route based on the location of the charging stations, energy constraints, time constraints, and performance constraints associated with the carrier robot and the drone. Subsequently, the survey system generates one or more subgraphs based on the intercommunity routes and performs various vehicle routing problem routines to define subgraph routes within the individual subgraphs, such as a traveling salesperson problem with drone energy management (TSP-D-EM) routine or a moving horizon heuristic formulation routine. Accordingly, the survey system of the present disclosure provides a path planning solution that can satisfy various performance and time constraints in a continuous manner.

Figure 1A:
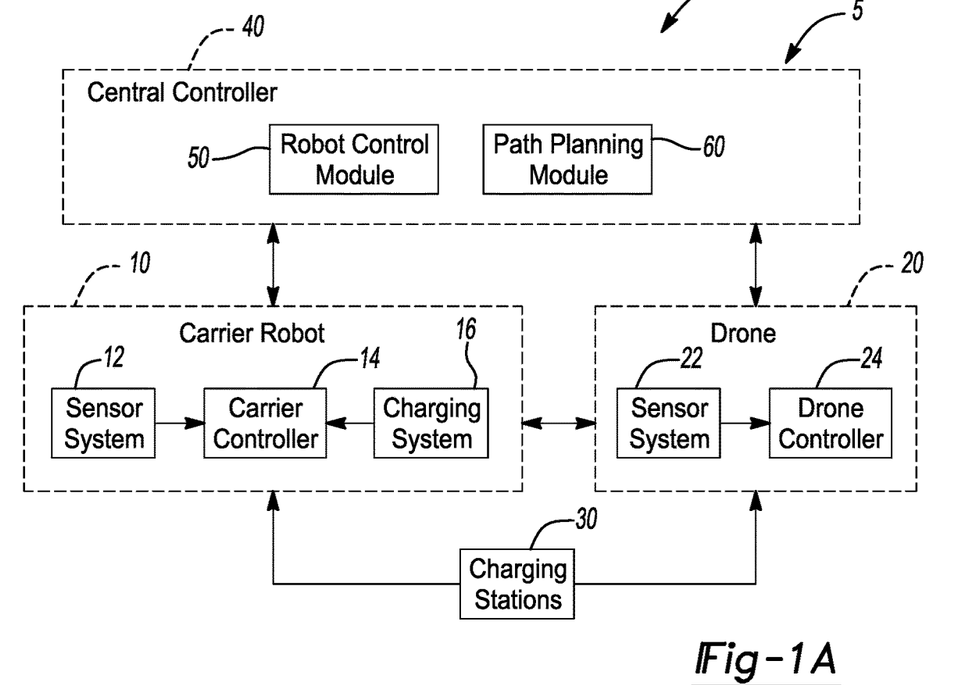
FIG. 1A is a block diagram of a survey system according to the teachings of the present disclosure.
Figure 1B:
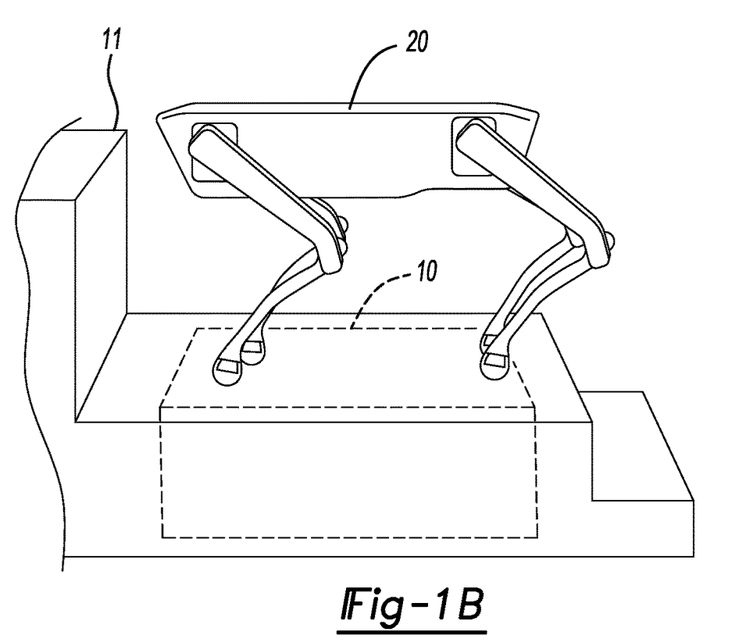
FIG. 1B is a schematic of a survey system according to the teachings of the present disclosure.

Referring to FIGS. 1A-1B, an environment 1 including a survey system 5 according to one or more forms of the present disclosure is provided. In one form, the survey system 5 includes a carrier robot 10, a drone 20, charging stations 30, and a central controller 40. While the central controller 40 is illustrated as part of the environment 1, it should be understood that the central controller 40 may be positioned remotely from the manufacturing environment 1. In one form, the carrier robot 10, the drone 20, and the central controller 40 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form and as shown in FIG. 1B, the carrier robot 10 is a wheeled carrier platform robot that includes a docking station 11 disposed thereon that is configured to physically support and/or accommodate the drone 20. As an example, the docking station 11 includes hardware/systems for attaching/mounting the drone 20 to the docking station 11 when the carrier robot 10 is traversing the environment 1. In one form, the drone 20 is a legged robot or an unmanned aerial vehicle robot configured to access places in the environment 1 that the carrier robot 10 may not access. It should be understood that the carrier robot 10 and/or the drone 20 may be implemented by other types of autonomous robots and are not limited to the examples described herein.

In one form and as shown in FIG. 1A, the carrier robot 10 includes a sensor system 12, a carrier controller 14, and a charging system 16, and the drone 20 includes a sensor system 22 and a drone controller 24. In one form, the carrier robot 10 and the drone 20 are partially or fully autonomous and configured to autonomously move to various locations of the environment 1 based on data from one or more autonomous navigation sensors disposed thereon (e.g., a global navigation satellite system (GNSS) sensor, an imaging sensor, a local position sensor, among others). Specifically, the carrier controller 14, the drone controller 24, and the central controller 40 are configured to process the data from the autonomous navigation sensors and perform known autonomous navigation routines to navigate the environment 1.

In one form, the sensor systems 12, 22 include image sensors configured to capture image data when performing a surveying routine of the environment 1. Example image sensors include, but are not limited to: an image sensor, a two-dimensional (2D) camera, a three-dimensional (3D) camera, an infrared sensor, a radar scanner, a laser scanner, among other imaging devices. Accordingly, the carrier controller 14 and the drone controller 24 may provide the captured image data to the central controller 40, which may generate a digital twin of the environment 1 using known digital twin generation routines.

In one form, the charging system 16 is disposed on the carrier robot 10 and includes electrical components that are configured to charge the drone 20 while it is supported by and/or attached to the carrier robot 10. In one form, the carrier robot 10 may have a battery life that is greater than a battery life of the drone 20. As described herein in further detail, the central controller 40 may selectively deploy the drone 20 to scan a given area of the environment 1 based on a surveying routine.

In one form, the central controller 40 includes a robot control module 50 and a path planning module 60. In one form, the robot control module 50 is configured to control the deployment and operation of the drone 20 and the operation of the carrier robot 10. As an example, the central controller 40 is configured to broadcast a command to the drone 20 to deploy and/or detach from the docking station 11 and autonomously navigate the environment 1 to initiate the surveying routines described herein in further detail.

In one form, the path planning module 60 is configured to define intercommunity and intracommunity paths in which the carrier robot 10 and the drone 20 traverse to survey the environment 1 and capture the image data. Additional details regarding the functionality of the path planning module 60 is provided below in further detail with reference to FIGS. 2-12.

To perform the functionality described herein, the carrier controller 14, the drone controller 24, and the central controller 40 may each include one or more processor circuits that are configured to execute machine-readable instructions stored in the one or more nontransitory computer-readable mediums, such as a random-access memory (RAM) circuit and/or read-only memory (ROM) circuit. Furthermore, the carrier controller 14 and the drone controller 24 may each include movement drivers and systems, transceivers, routers, and/or input/output interface hardware to perform the functionality described herein.

Figure 2:
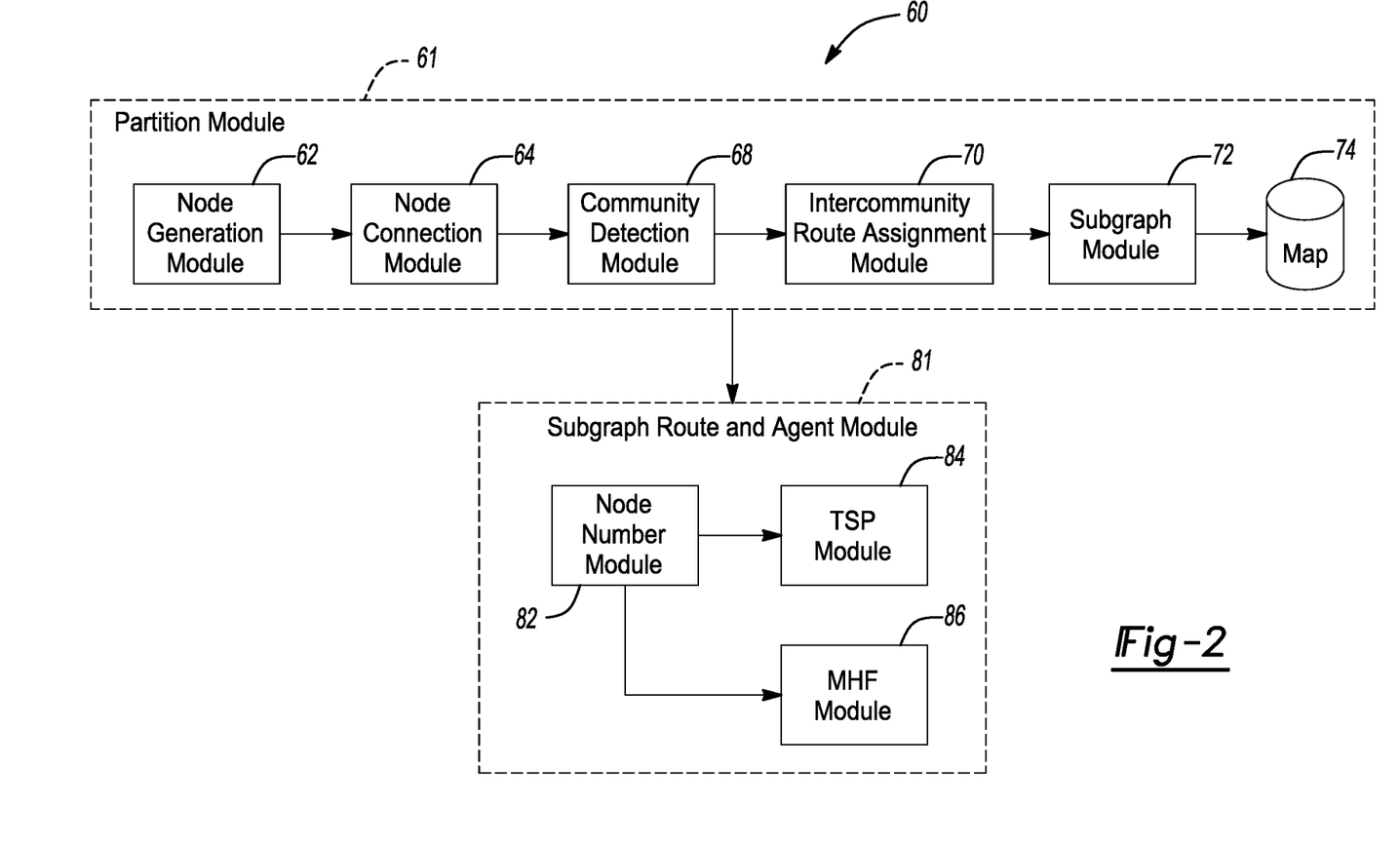
FIG. 2 is a block diagram of a path planning module of a survey system according to the teachings of the present disclosure.

Referring to FIG. 2, the path planning module 60 of the central controller 40 includes a partition module 61 for generating subgraphs and a subgraph route and agent (SRA) module 81 for generating subgraph routes. It should be readily understood that any one of the modules/components of the path planning module 60 can be provided at the same location or distributed at different locations (e.g., via one or more edge computing devices) and communicably coupled accordingly. In one form, the partition module 61 includes a node generation module 62, a node connection module 64, a community detection module 68, an intercommunity route assignment module 70, a subgraph module 72, and a map 74.

Figure 3:
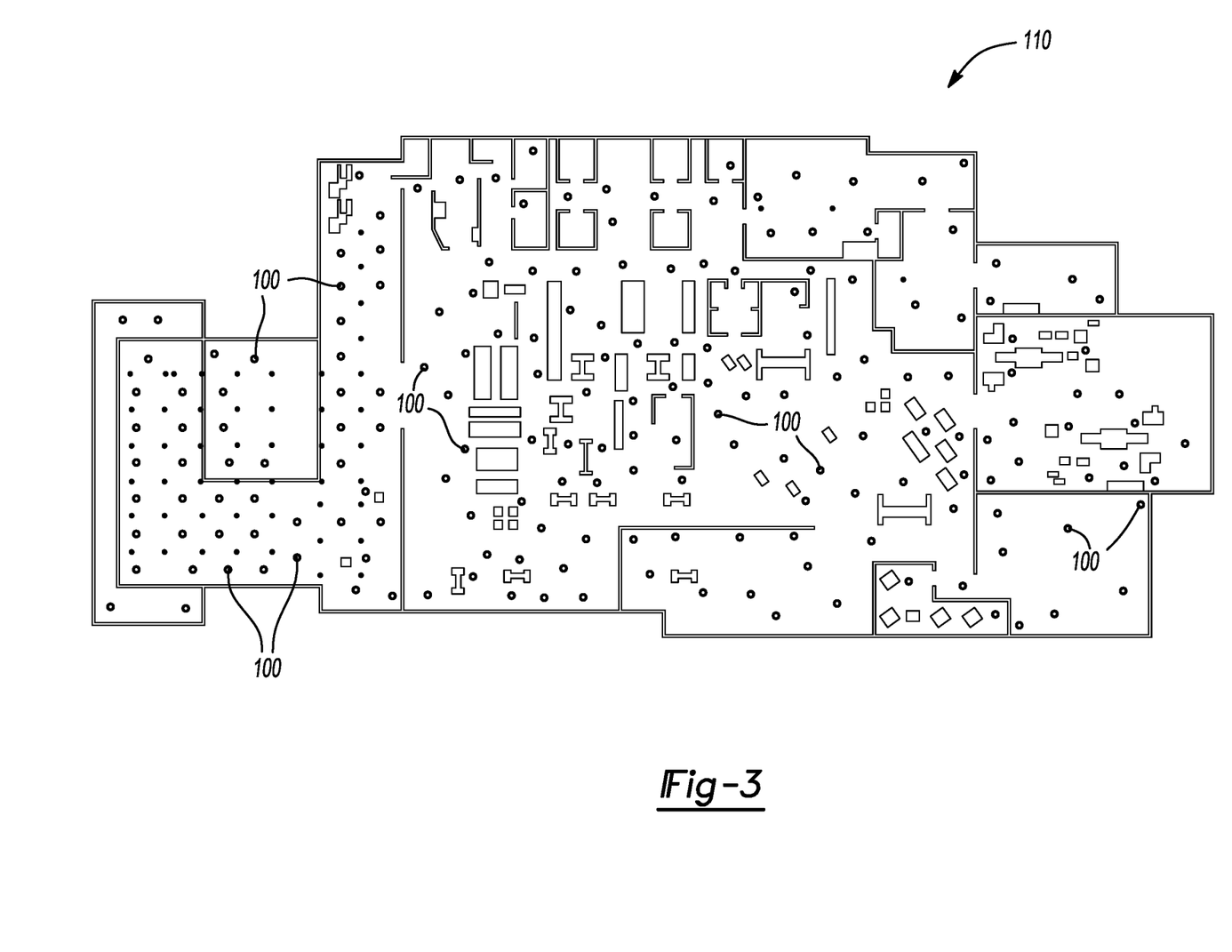
FIG. 3 illustrates a plurality of nodes of a map according to the teachings of the present disclosure.

Referring to FIGS. 2-3, in one form, the node generation module 62 is configured to generate a plurality of nodes 100 corresponding to various locations of the environment 1. As an example, the node generation module 62 is configured to generate a plurality of nodes 100 within an image 110 representing the environment 1 based on known image processing routines and/or an input from an operator/technician indicating a selection of the location as a point of interest. In one form, the plurality of nodes 100 is defined based on a layout, physical boundaries, and/or other characteristics of the environment 1. As described below in further detail, at least one of the carrier robot 10 and the drone 20 are configured to perform the surveying routine at each of the nodes 100.

Figures 4, 5:
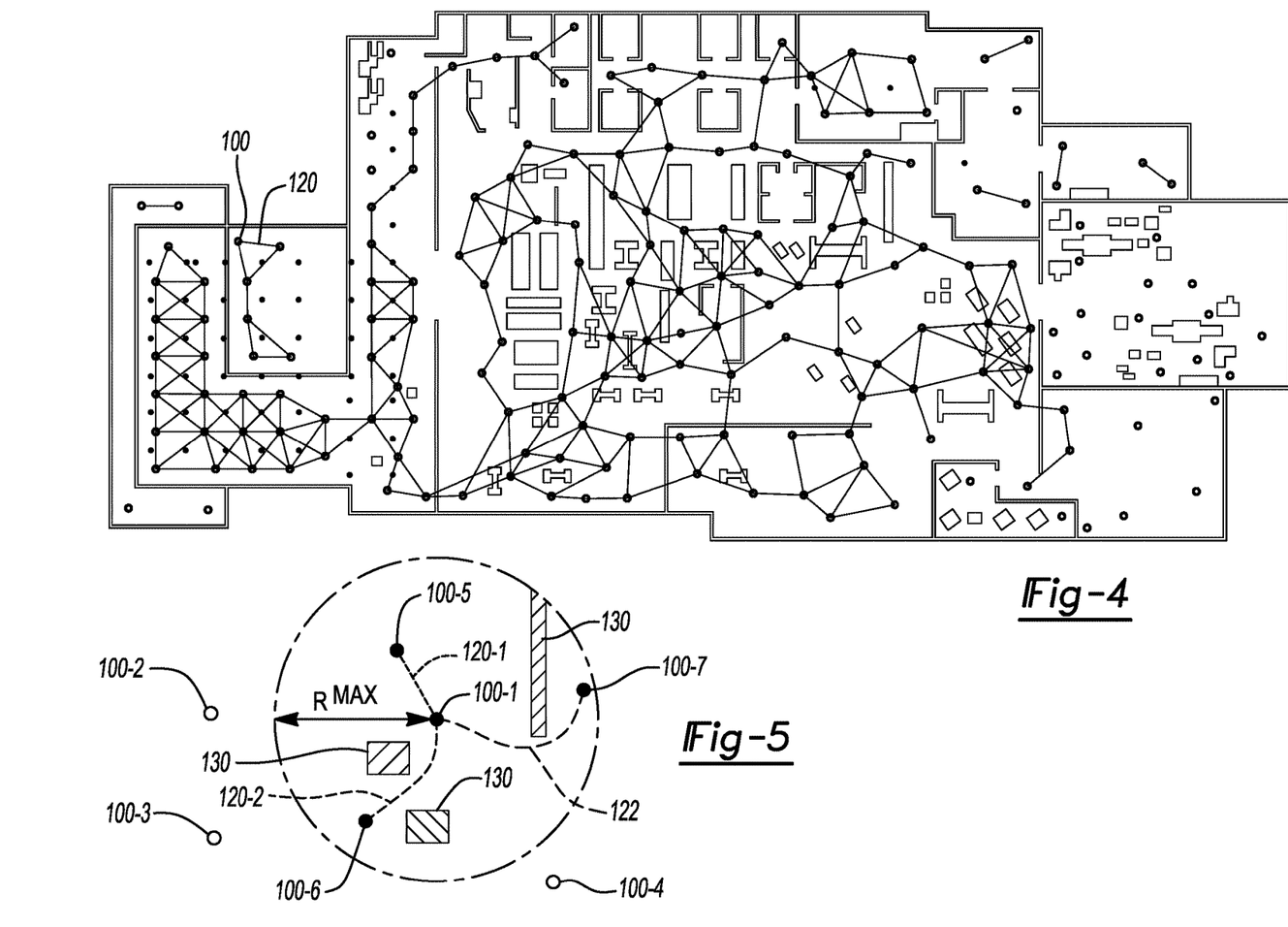
FIG. 4 illustrates a plurality of nodes connected by a plurality of edges of a map according to the teachings of the present disclosure.
FIG. 5 illustrates connecting a plurality of nodes based on one or more edge constraints according to the teachings of the present disclosure.

Referring to FIGS. 2 and 4-5, in one form, the node connection module 64 is configured to connect the nodes 100 via a plurality of edges 120 and based on one or more edge constraints. In one form, the edge constraints correspond to traversable and/or allowable travel paths of the carrier robot 10 or the drone 20 between the nodes 100. In one form, the edge constraints are based on obstacles 130 and the layout of the environment 1, minimum travel distances between the nodes 100, and/or a radial distance indicating a communication range of the carrier robot 10 and the drone 20. In one form, the edge connection module 64 may perform known minimum travel distance routines to determine the minimum travel distance, such as Dijkstra's routine.

As an example and as shown in FIG. 5, the edge constraints may inhibit the edge connection module 64 from connecting node 100-1 and nodes 100-2, 100-3, 100-4 since the nodes 100-2, 100-3, 100-4 are beyond a communication range of the carrier robot 10 and the drone 20 (indicated by radial distance $R^{MAX}$ in FIG. 5). Additionally, the edge constraints may cause the edge connection module 64 to connect the node 100-1 with nodes 100-5, 100-6 via edges 120-1, 120-2 since a minimum travel distance between the nodes 100-1, 100-5 and the nodes 100-1, 100-6 is less than the communication range. As another example, the edge constraints may prevent the edge connection module 64 from connecting node 100-1 and node 100-7 since the minimum travel distance between the nodes 100-1, 100-7 (shown by dotted line 122 in FIG. 5) is greater than the communication range of the carrier robot 10 and the drone 20 ($R^{MAX}$). That is, the obstacle 130 inhibits the navigation of the carrier robot 10 and the drone 20 between the nodes 100-1, 100-7. It should be understood that the edge connection module 64 iteratively repeats the above-described node connection routine for each node 100.

In one form, the node connection module 64 assigns one or more traversability scores for each edge 120 that indicates a traversability of at least one of the carrier robot 10 and the drone 20 along the edge 120. In one form, the traversability score is based on a threshold travel distance between the nodes 100 (e.g., a minimum travel distance), obstacles of the environment 1, and/or the geometry and/or mobility characteristics of the carrier robot 10 and the drone 20. In one form, the node connection module 64 assigns, for each edge 120, a separate traversability score for the carrier robot 10 and the drone 20. As an example, the edge connection module 64 may assign a larger traversability score for each of the carrier robot 10 and the drone 20 along the edge 120-1 based on a relatively smaller minimum travel distance, the lack of obstacles 130 between the nodes 100-1, 100-2, and the lack of any geometry/mobility characteristics that inhibit the carrier robot 10 and the drone 20 from traveling between the nodes 100-1, 100-2. As another example, the edge connection module 64 may assign a larger traversability score for the drone 20 along the edge 120-2, but the edge connection module 64 may assign a lower traversability score for the carrier robot 10 along the edge 120-2 since the geometry of the carrier robot 10 inhibits travel between the adjacent obstacles 130.

Figure 6:
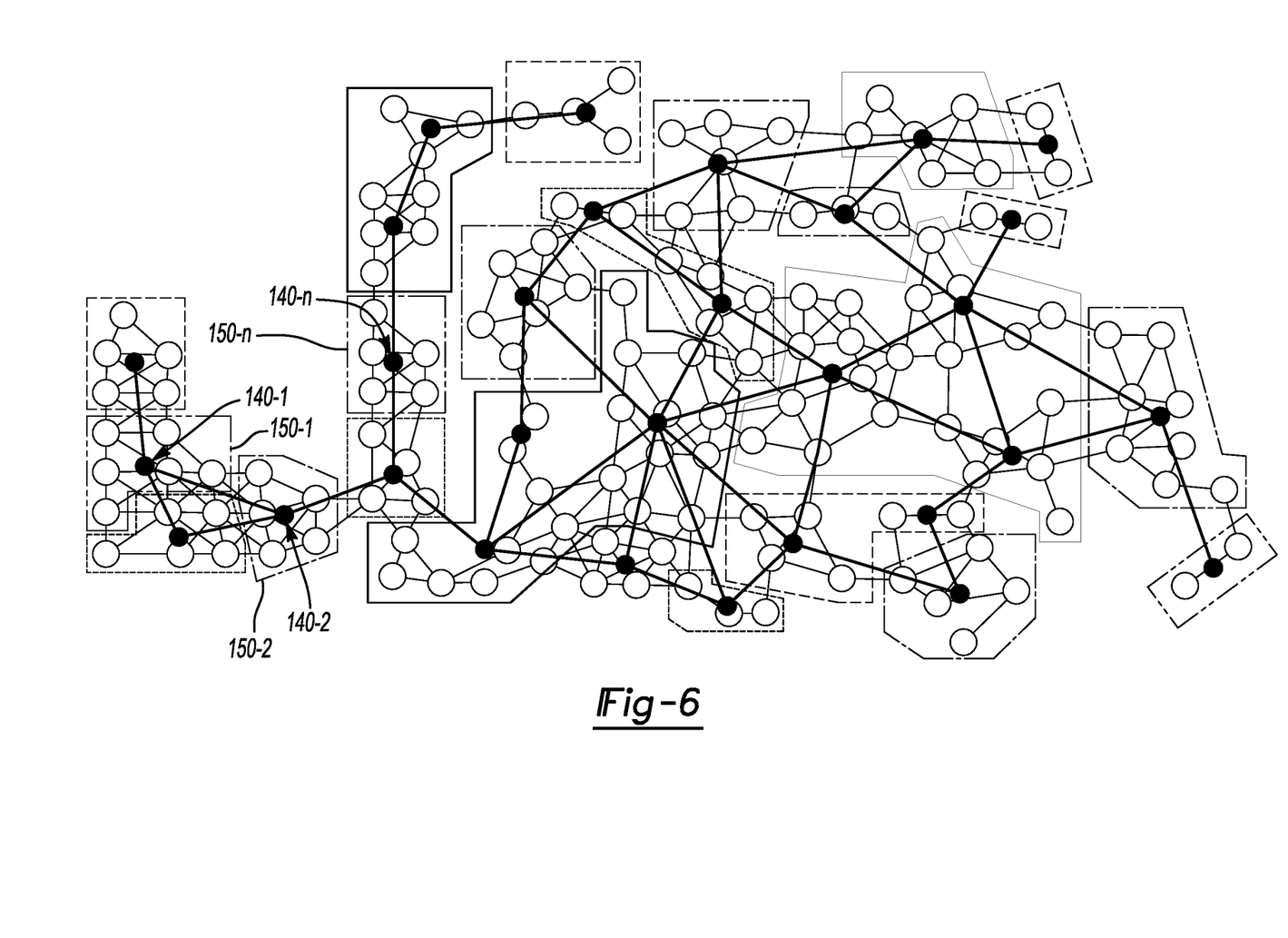
FIG. 6 illustrates generating a plurality of communities and community centroids based on a plurality of nodes and a plurality of edges according to the teachings of the present disclosure.

Referring to FIGS. 2 and 6, in one form, the community detection module 66 is configured to segment the plurality of nodes 100 into a plurality of communities 140-1, 140-2, . . . 140-n (collectively referred to herein as "communities 140") and a plurality of community centroids 150-1, 150-2, . . . 150-n (collectively referred to herein as "community centroids 150"). In one form, each community 140 includes a set of the nodes 100 (e.g., one or more nodes 100), and the community centroid 150 corresponds to a centroid location within the respective community 140. In one form, the community detection module 66 may employ known label propagation routines, such as an asynchronous label propagation routine, to segment the plurality of nodes 100 into the communities 140 and the community centroids 150. In one form, the community detection module 66 may segment the nodes 100 into the communities 140 based on the traversability scores of the edges 120 between the nodes 100 (e.g., one or more nodes 100 may be assigned to another community 140 if the edge 120 therebetween has a traversability score that deviates from a median, mean, or other arithmetic representation beyond a threshold amount within the given community 140).

Figure 7:
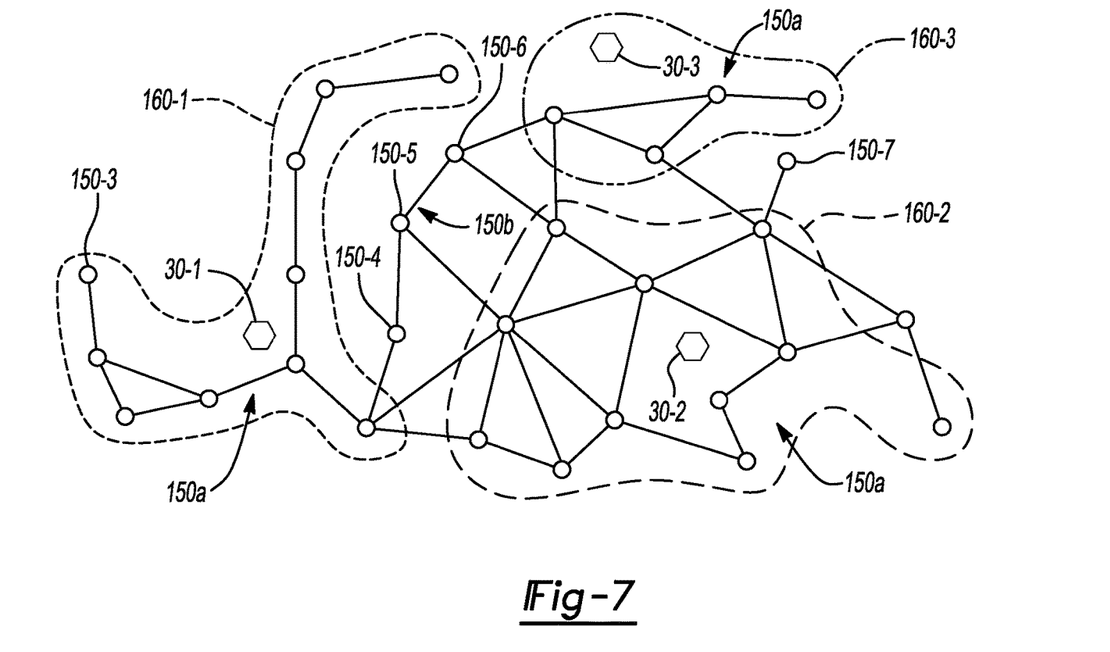
FIG. 7 illustrates primary community centroids and auxiliary community centroids according to the teachings of the present disclosure.

Referring to FIGS. 2 and 7, in one form, the community type module 68 is configured to determine a community type of each community centroid 150 as one of a primary type and an auxiliary type based on a distance between the community centroid 150 and the one or more charging stations 30. In one form, the community type module 68 determines, for each community centroid 150, the distance between each of the charging stations 30 and the community centroids 150 and selects the two charging stations 30 (or other predefined number of charging stations 30) that are nearest to the community centroid 150. Subsequently, the community type module 68 determines a ratio between the distances of the identified charging stations 30 and the community centroid 150 and identifies the community centroid 150 as one of the primary type and the auxiliary type based on the ratio.

As an example and as shown in FIG. 7, the community type module 68 determines a distance between the community centroid 150-3 and charging station 30-1 (i.e., the first distance), the community centroid 150-3 and charging station 30-2 (i.e., the second distance), and the community centroid 150-3 and charging station 30-3 (i.e., the third distance). Moreover, the community type module 68 selects the charging stations 30-1, 30-2 since the first and second distances are less than the third distance for determining the community type. Subsequently, the community type module 68 determines a ratio of the first distance and the second distance to identify the corresponding community type. Specifically, the community type module 68 determines the community centroid 150-3 is a primary type since the ratio of the first and second distances is less than a threshold value. The community type module 68 may iteratively determine the community type for each community centroid 150 and determine that, for example, community centroids 150-4, 150-5, 150-6, 150-7 are auxiliary-type community centroids 150, and the remaining community centroids 150 are primary-type community centroids 150. The primary-type community centroids 150 may be collectively referred to herein as "primary-type community centroids 150a," and the auxiliary-type community centroids 150 may be collectively referred to herein as "auxiliary-type community centroids 150b."

In one form, the community type module 68 is configured to group the primary-type community centroids 150a based on a minimum travel distance to the charging stations 30. As an example, the community type module 68 identifies a first set 160-1 of primary-type community centroids 150a that is nearest to the charging station 30-1, a second set 160-2 of primary-type community centroids 150a that is nearest to the charging station 30-2, and a third set 160-3 of primary-type community centroids 150a that are nearest to the charging station 30-3.

Figure 8:
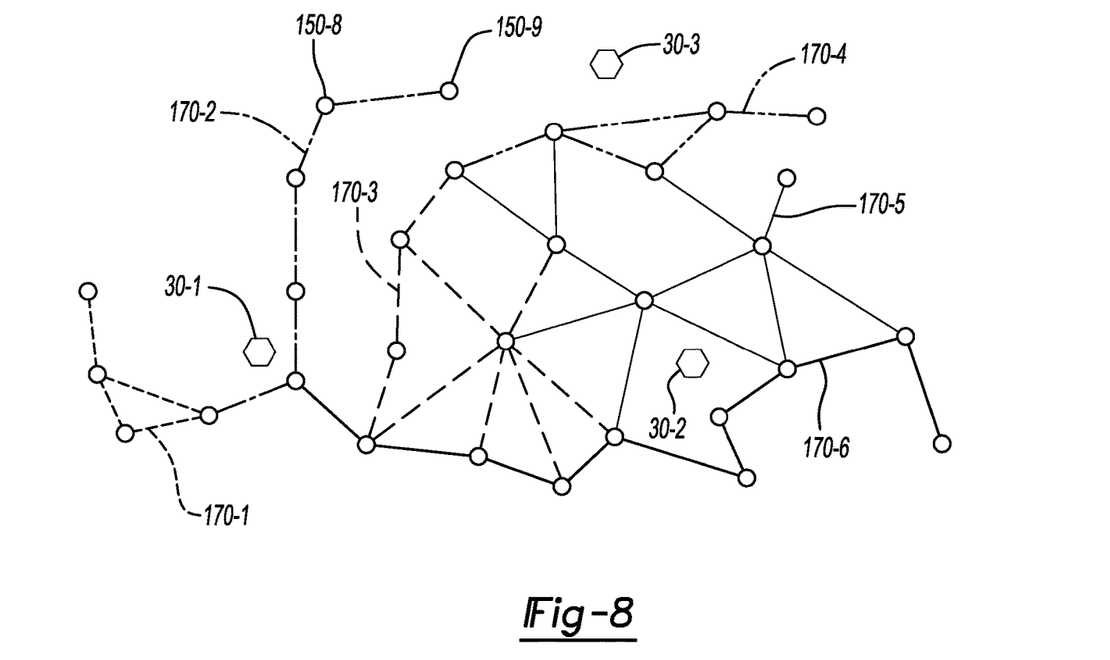
FIG. 8 illustrates routes assigned to primary community centroids and auxiliary community centroids according to the teachings of the present disclosure.

Referring to FIGS. 2 and 8, in one form, the intercommunity route assignment module 70 is configured to generate a plurality of intercommunity routes based on the community centroids 150, the one or more charging stations 30, the community types, and/or one or more performance constraints. Example performance constraints include, but are not limited to, an energy consumption required to survey the community 140 associated with the community centroid 150 and/or an amount of time required to survey the community 140 associated with the community centroid 150, which is hereinafter referred to as the "intracommunity time." In one form, the intracommunity time may be based on the time to travel between the nodes 100 of the community 140 and the amount of time needed to scan the environment 1 at each node 100. In some forms, the performance characteristics may also include an amount of time required to travel between communities 140, which is hereinafter referred to as the "intercommunity time," and/or an energy consumption required to travel between communities 140.

In one form, the intercommunity route assignment module 70 generates the intercommunity routes by iteratively assigning routes to the primary-type community centroids 150a and then iteratively assigning routes to the auxiliary-type community centroids 150. In one form, the intercommunity route assignment module 70 generates the intercommunity routes such that they originate from at least one of the charging stations 30.

In one form, the intercommunity route assignment module 70 selects the first charging station 30-1 and selects the first set 160-1 of primary-type community centroids 150a associated with the first charging station 30-1. The intercommunity route assignment module 70 selects a community centroid 150 from the first set 160-1 of primary-type community centroids that is furthest from the first charging station 30-1 (e.g., the community centroid 150-9). Subsequently, the intercommunity route assignment module 70 generates a first intercommunity route 170-1 that originates from the first charging station 30-1 and ends at the selected community centroid 150 provided that the energy consumption/intracommunity time of the corresponding community 140 is less than a respective threshold value.

When the intercommunity route assignment module 70 generates the first intercommunity route 170-1, the intercommunity route assignment module 70 selects the next remaining community centroid 150 from the first set 160-1 of primary-type community centroids 150a that is furthest from the first charging station 30-1 (e.g., the community centroid 150-8). It should be understood that the intercommunity route assignment module 70 may select any one of the remaining community centroids 150 from the first set 160-1 of primary-type community centroids 150a and is not limited to the example described herein.

Subsequently, the intercommunity route assignment module 70 assigns the first intercommunity route 170-1 to the selected community centroid 150 provided that the energy consumption/intracommunity time of the corresponding community centroid 150 (e.g., the community centroid 150-8), the energy consumption/intracommunity times of other community centroids assigned to the first intercommunity route 170-1 (e.g., the community centroid 150-9), and the intercommunity time between the community centroids assigned to the first intercommunity route 170-1 are each less than a respective threshold value. If one of the performance constraints is not satisfied when assigning the first intercommunity route 170-1 to the selected community centroid 150, the intercommunity route module 70 generates a new intercommunity route 170 (e.g., intercommunity route 170-2) for the selected community centroid 150. As used herein, the intercommunity route 170 may refer to at least one of intercommunity routes 170-1, 170-2, 170-2, 170-3, 170-4, 170-5, 170-6.

As a specific example, the intercommunity route module 70 assigns the community centroid 150-8 to the first intercommunity route 170-1 provided that the communities 140 associated with community centroids 150-8, 150-9 can be completed within a predetermined period of time and without further charging of the carrier robot 10 at the charging station 30-1. Furthermore, the intercommunity route module 70 assigns the community centroid 150-8 to a second intercommunity route 170 if the intercommunity time, intracommunity time, and/or energy consumption constraints are not satisfied.

In one form, the intercommunity route assignment module 70 iteratively performs the route assignment routine such that each primary-type community centroid 150*a* is assigned to a given intercommunity route 170. When each primary-type community centroid 150*a* is assigned to a given intercommunity route 170, the intercommunity route assignment module 70 selectively assigns the auxiliary-type community centroids 150*b* to one of the given intercommunity routes 170. In one form, the intercommunity route assignment module 70 determines whether the one or more intercommunity routes 170 are available based on an energy consumption of the auxiliary-type community centroid 150*b*, an intracommunity time of the auxiliary-type community centroid 150*b*, and/or an intercommunity time between the auxiliary-type community centroid 150*b* and one or more of the primary-type community centroids 150*a* along the intercommunity routes 170. The intercommunity route assignment module 70 assigns the nearest available intercommunity route 170 to the auxiliary-type community centroid 150*b* in response to the determination that the performance constraints are satisfied when it is added to the intercommunity route 170. If one of the performance constraints is not satisfied when assigning one of the intercommunity routes 170 to the auxiliary-type community centroid 150*b*, the intercommunity route module 70 generates an additional intercommunity route 170 for the selected auxiliary-type community centroid 150*b*.

Figures 9, 10:
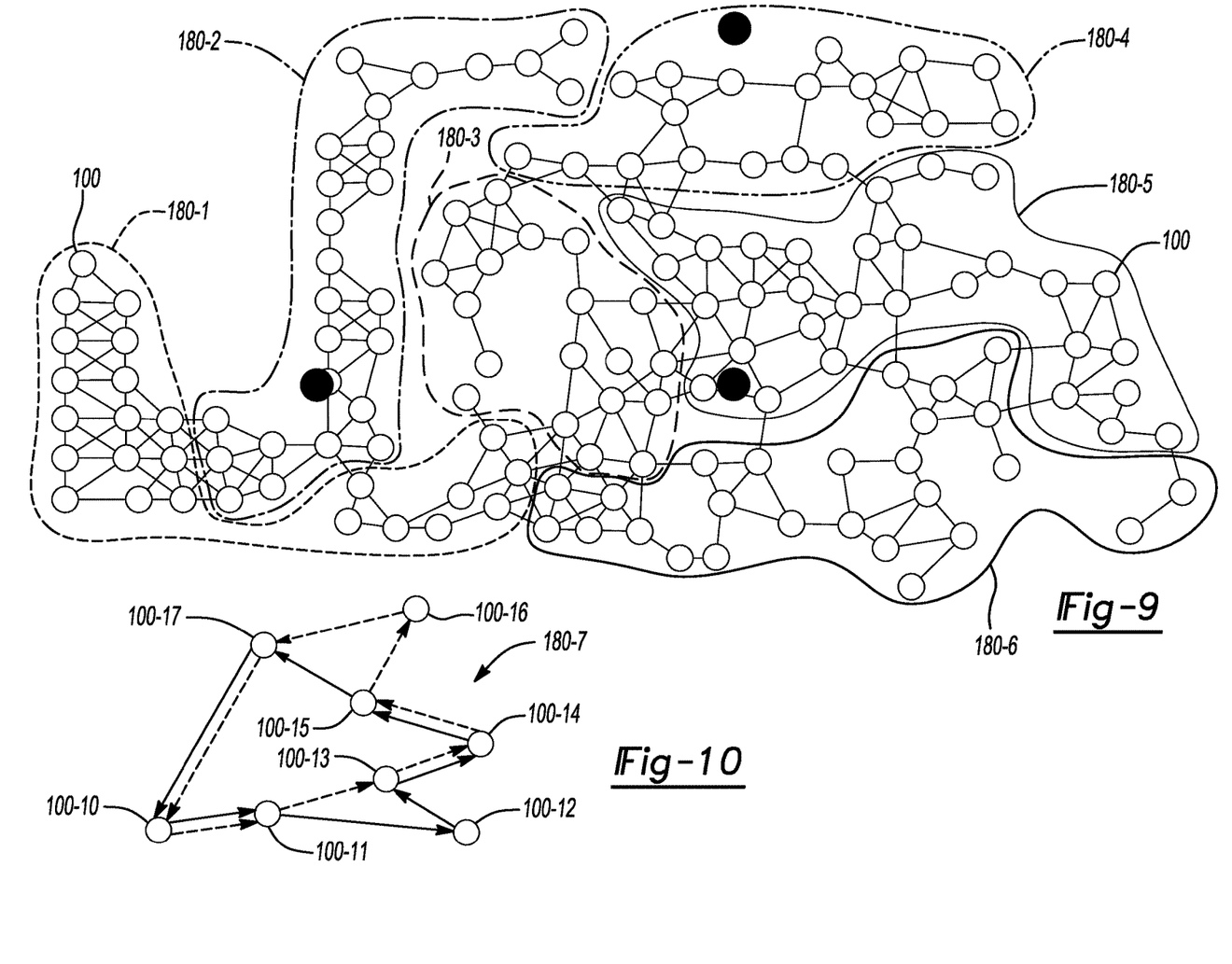
FIG. 9 illustrates a subgraph based on the routes assigned to primary community centroids and auxiliary community centroids according to the teachings of the present disclosure.
FIG. 10 illustrates generating a subgraph route based on a traveling salesperson problem with drone energy management (TSP-D-EM) routine according to the teachings of the present disclosure.

Referring to FIGS. 2 and 9, in one form, the subgraph module 72 is configured to generate one or more subgraphs 180-1, 180-2, 180-3, 180-4, 180-5, 180-6 (collectively referred to herein as "subgraphs 180") based on the intercommunity routes 170 and store it as the map 74. In one form, each of the subgraphs 180 originates from one of the charging stations 30, thereby enabling the carrier robot 10 and the drone 20 to collectively perform the surveying routine at the given nodes 100 within a subgraph 180 in a continuous manner and without charging the carrier robot 10 and the drone 20 at the charging stations 30.

Referring to FIG. 2, in one form, the SRA module 81 includes a node number module 82, a traveling salesperson problem (TSP) module 84, and a moving horizon formulation (MHF) module 86. In one form, the node number module 82 is configured to determine the number of nodes 100 within each of the subgraphs 180. The node number module 82 is configured to selectively activate one of the TSP module 84 and the MHF module 86 to generate the subgraph routes within the subgraphs 180 based on the number of nodes 100. As an example, the node number module 82 activates the TSP module 84 for determining the subgraph route of the given subgraph 180 in response to the number of nodes 100 being less than a threshold value (e.g., ten nodes). Additionally, the node number module 82 activates the MHF module 86 for determining the subgraph route of the given subgraph 180 in response to the number of nodes 100 being greater than or equal to the threshold value. Accordingly, the node number module 82 inhibits latency and reduces the computational resources needed for generating the subgraph routes of the subgraphs 180.

Referring to FIGS. 2 and 10, in one form, the TSP module 84 performs the TSP-D-EM routine, which may be a mixed integer linear routine that includes an objective function configured to reduce the total time needed to survey the nodes 100. In one form, the objective function is based on the time in which the carrier robot 10 and the drone 20 move between nodes and the time required for the drone 20 to detach from the carrier robot 10 and survey the environment 1 at a location associated with the node 100. In one form, the mixed integer linear routine includes one or more operation constraints, such as flow conservation equations of the drone 20 to detach from the carrier robot 10, rules defining the number of instances each node 100 can be visited (e.g., one time), rules defining which nodes 100 are to be surveyed, and/or upper and lower bounds, among other operational constraints. It should be understood that the operational constraints may include various other operational constraints and are not limited to the examples described herein.

In one form, the mixed integer linear routine includes energy management constraints, including, but not limited to: energy consumption limits when surveying routine at each node 100, energy consumption limits when traveling between nodes 100, charging events in which the charging system 16 charges the drone 20 when the drone 20 is attached to the carrier robot 10, the battery life of the drone 20, and upper and lower bounds, among other energy constraints. It should be understood that the energy constraints may include various other energy constraints and are not limited to the examples described herein.

As an example implementation of the TSP-D-EM routine of subgraph 180-7 shown in FIG. 10, the TSP module 84 instructs at least one of the carrier robot 10 and the drone 20 to survey node 100-10, to collectively travel to node 100-11 (the carrier robot 10 path is shown with a solid line, and the drone 20 path is shown with a dashed line in FIG. 10), and to have at least one of the carrier robot 10 and the drone 20 to survey node 100-11. When the surveying routine is complete at the node 100-11, the drone 20 detaches from the carrier robot 10 and travels to node 100-13 to perform the surveying routine, the carrier robot 10 travels to node 100-12 to perform the surveying routine, and the carrier robot 10 and the drone 20 meet at the node 100-13 when the surveying routines are completed. The drone 20 attaches itself to the carrier robot 10 via the docking station 11 at the node 100-13, and the carrier robot 10 and the drone 20 collectively travel to nodes 100-14, 100-15 to perform the surveying routine at the respective nodes. When the surveying routine is complete at the node 100-15, the drone 20 detaches from the carrier robot 10 and travels to node 100-16 to perform the surveying routine, the carrier robot 10 travels to node 100-17 to perform the surveying routine, and the carrier robot 10 and the drone 20 meet at the node 100-17 when the surveying routines are completed at the respective nodes. The drone 20 attaches itself to the carrier robot 10 via the docking station 11 at the node 100-17, and the carrier robot 10 and the drone 20 collectively return to the node 100-10.

Figures 11A, 11B:
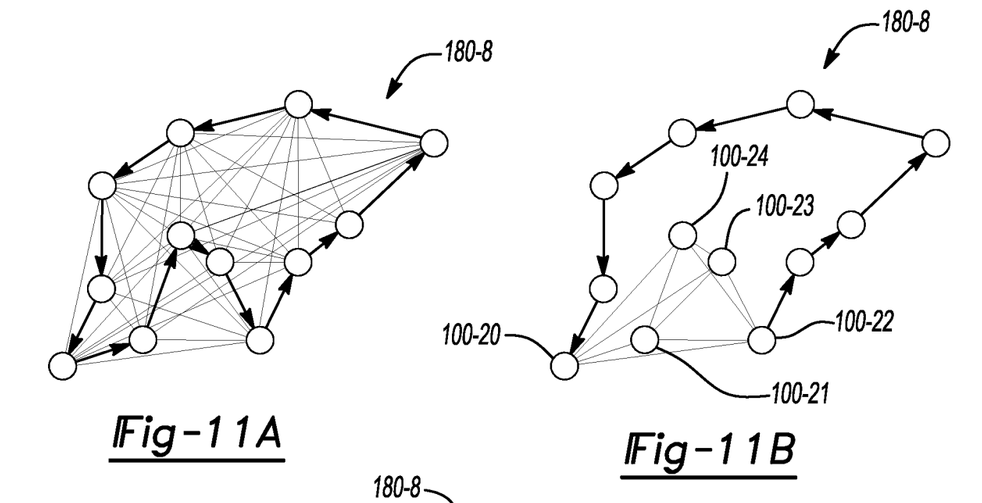
FIG. 11A illustrates a traveling salesperson problem (TSP) routine for generating a subgraph route based on a moving horizon formulation (MHF) routine according to the teachings of the present disclosure.
FIG. 11B illustrates selecting a set of nodes of an MHF routine according to the teachings of the present disclosure.
Figure 11C:
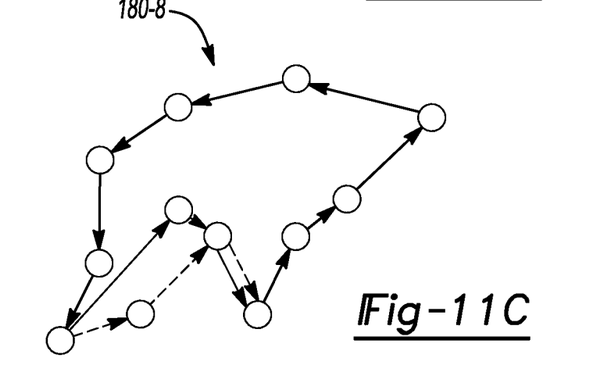
FIG. 11C illustrates performing a TSP-D-EM routine for a selected set of nodes of an MHF routine according to the teachings of the present disclosure.
Figure 11D:
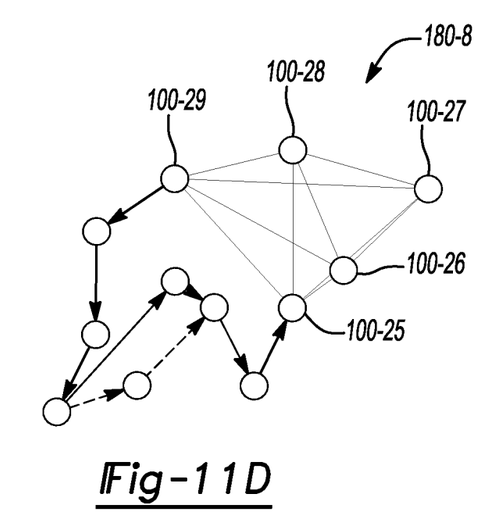
FIG. 11D illustrates selecting another set of nodes of an MHF routine according to the teachings of the present disclosure.
Figure 11E:
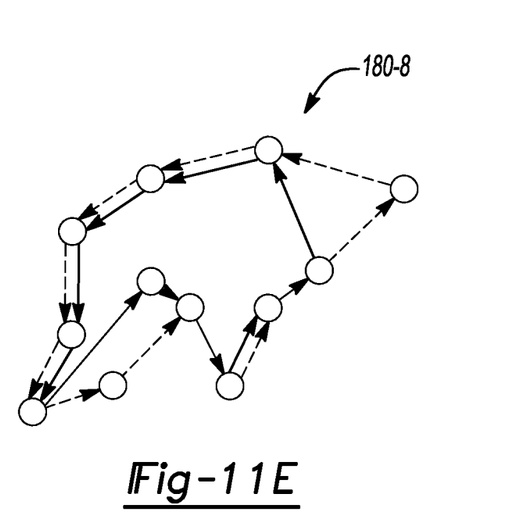
FIG. 11E illustrates generating the subgraph route based on the MHF routine according to the teachings of the present disclosure.

Referring to FIGS. 2 and 11A-11E, in one form, the MHF module 86 performs the MHF routine, which may include performing known TSP routines for one of the carrier robot 10 and the drone 20 among the nodes 100, as shown in FIG. 11A. Additionally, and as shown in FIGS. 11B-11C, the MHF routine includes selecting a set of nodes 100 from subgraph 180-8 based on a preview horizon value (e.g., selecting nodes 100-20, 100-21, 100-22, 100-23, 100-24 when the preview horizon value is equal to five) and performing the TSP-D-EM routine described above for the selected set of nodes 100. The preview horizon value may be selected based on computing resources and/or capabilities of the central controller 40. In one form and as shown in FIGS. 11D-11E, the MHF routine iteratively selects additional sets of nodes 100 (e.g., nodes 100-25, 100-26, 100-27, 100-28, 100-29) based on the preview horizon value and performs the TSP-D-EM routine for the selected additional sets of nodes 100 until the subgraph route is defined.

Figure 12:
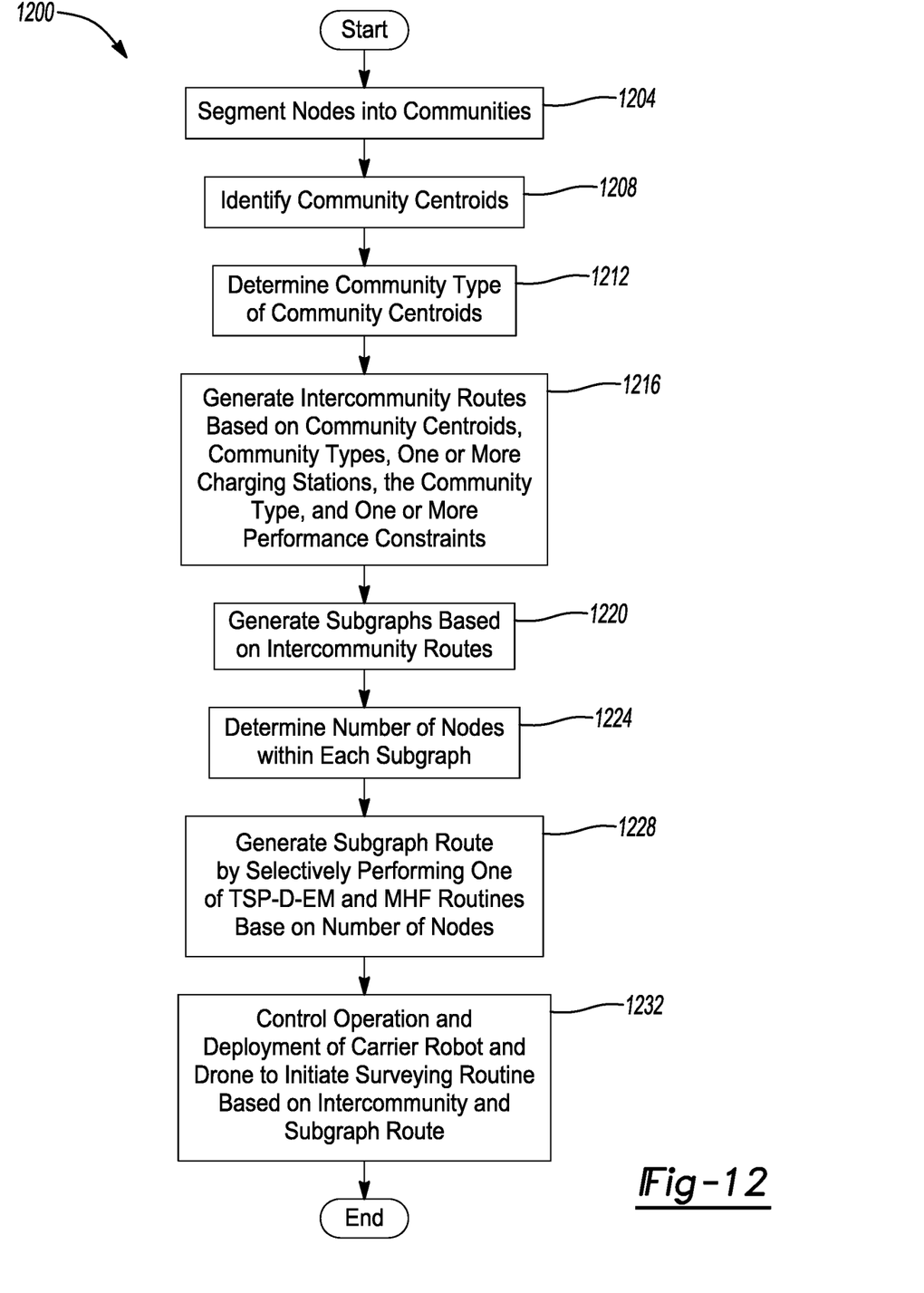
FIG. 12 is a flowchart illustrating an example routine for surveying the environment according to the teachings of the present disclosure.

Referring to FIG. 12, an example routine 1200 for surveying the environment 1 is shown. At 1204, the central controller 40 segments the plurality of nodes 100 into a plurality of communities 140. At 1208, the central controller 40 identifies a plurality of community centroids 150 based on the plurality of communities 140. As described above, the central controller 40 may perform the asynchronous label propagation routine to segment the nodes 100 into the communities 140 and identify the community centroids 150. At 1212, the central controller 40 determines a community type of each community centroid 150, and the central controller 40 generates a plurality of intercommunity routes 170 based on the plurality of community centroids, the one or more charging stations, the community type, and one or more performance constraints at 1216.

At 1220, the central controller 40 generates a plurality of subgraphs 180 based on the intercommunity routes 170 and determines the number of nodes 100 within each subgraph 180 at 1224. At 1228, the central controller 40 generates the subgraph routes by selectively performing one of the TSP-D-EM routine and the MHF routine for each subgraph 180 based on the number of nodes 100. At 1232, the central controller 40 selectively controls the operation and deployment of the carrier robot 10 and the drone 20 to initiate the surveying routine based on the intercommunity routes and subgraph routes.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons, including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for surveying an environment, the method comprising:
    segmenting a plurality of nodes into a plurality of communities based on a first traversability score and a second traversability score of one or more edges disposed between each node of the plurality of nodes, wherein each community from among the plurality of communities includes a set of nodes from among the plurality of nodes, and wherein the first traversability score is indicative of a traversability of a carrier robot along each edge of the one or more edges and the second traversability score is indicative of a traversability of a drone along each edge of the one or more edges;
    identifying a plurality of community centroids based on the plurality of communities, wherein each community centroid from among the plurality of community centroids corresponds to a respective community from among the plurality of communities;
    determining, for each community centroid from among the plurality of community centroids, a community type based on a distance between the community centroid and one or more charging stations;
    generating a plurality of intercommunity routes based on the plurality of community centroids, the one or more charging stations, the community type, and one or more performance constraints; and
    deploying the carrier robot or the drone to move according to the plurality of intercommunity routes and to perform a surveying routine about the plurality of intercommunity routes, wherein the carrier robot is deployed in response to a value of the first traversability score exceeding a value of the second traversability score, and wherein the drone is deployed in response to the value of the second traversability score exceeding the value of the first traversability score.

2. The method of claim 1 further comprising segmenting the plurality of nodes into the plurality of community centroids and the plurality of communities based on an asynchronous label propagation routine.

3. The method of claim 1 further comprising:
    connecting the plurality of nodes via a plurality of edges based on one or more edge constraints, wherein the one or more edge constraints are based on a threshold travel distance, a radial distance associated with each node of the plurality of nodes, the first traversability score, and the second traversability score; and
    segmenting the plurality of nodes into the plurality of communities based on the plurality of edges.

4. The method of claim 1, wherein the first traversability score and the second traversability score are based on a threshold travel distance between each node of the plurality of nodes, one or more obstacles of the environment, a geometry of the carrier robot or the drone, one or more mobility characteristics associated with the carrier robot or the drone, or a combination thereof.

5. The method of claim 1, wherein the one or more charging stations comprises a plurality of charging stations, and wherein the method further comprises:
determining a ratio based on a distance between each of the plurality of charging stations and each community centroid of the plurality of community centroids; and
identifying the community type as one of a primary type or an auxiliary type based on the ratio.

6. The method of claim 1 further comprising:
for each community centroid of the plurality of community centroids:
selecting a first charging station and a second charging station from among the one or more charging stations;
determining a first distance between the first charging station and the community centroid; and
determining a second distance between the second charging station and the community centroid, wherein the community type of the community centroid is further based on a ratio between the first distance and the second distance.

7. The method of claim 6 further comprising:
for each community centroid of the plurality of community centroids:
determining one or more additional distances between the community centroid and one or more additional charging stations from among the one or more charging stations; and
selecting the first charging station and the second charging station when the
one or more additional distances are greater than the first distance and the second distance.

8. The method of claim 1, wherein generating the plurality of intercommunity routes based on the plurality of community centroids, the one or more charging stations, the community type, and the one or more performance constraints further comprises:
selecting a first charging station from among the one or more charging stations;
selecting a first set of community centroids from among the plurality of community centroids, wherein each community centroid from among the first set of community centroids is a primary type, and wherein a distance between the first set of community centroids and the first charging station is less than a distance between the first set of community centroids and a second charging station from among the one or more charging stations;
selecting a first community centroid from among the first set of community centroids, wherein a distance between the first community centroid and the first charging station is greater than a distance between each remaining community centroid of the first set of community centroids and the first charging station; and
assigning the first community centroid to a first intercommunity route from among the plurality of intercommunity routes when an energy consumption of the first community centroid and an intracommunity time of the first community centroid satisfy the one or more performance constraints.

9. The method of claim 8 further comprising:
selecting a second community centroid from among the first set of community centroids;
assigning the second community centroid to the first intercommunity route when an energy consumption of the second community centroid, an intracommunity time of the second community centroid, and an intercommunity time of the first community centroid and the second community centroid satisfy the one or more performance constraints.

10. The method of claim 8, wherein the first intercommunity route originates from the first charging station.

11. The method of claim 1 further comprising selectively assigning an auxiliary set of community centroids from among the plurality of community centroids to the plurality of intercommunity routes, wherein each community centroid from among the auxiliary set of community centroids is an auxiliary type.

12. The method of claim 11, wherein selectively assigning the auxiliary set of community centroids from among the plurality of community centroids to the plurality of intercommunity routes further comprises:
for each community centroid from among the auxiliary set of community centroids:
determining whether one or more intercommunity routes from among the plurality of intercommunity routes are available based on an energy consumption of the community centroid and an intercommunity time of the community centroid; and
in response to the one or more intercommunity routes being available, assigning the community centroid to a given intercommunity route from among the one or more intercommunity routes based on a distance between the community centroid and the one or more intercommunity routes.

13. The method of claim 12 further comprising:
for each community centroid from among the auxiliary set of community centroids:
generating an additional route based on the community centroid and the one or more charging stations in response to the one or more intercommunity routes not being available.

14. A system for surveying an environment, the system comprising:
a processor; and
a nontransitory computer-readable medium including instructions that are executable by the processor, wherein the instructions include:
segmenting a plurality of nodes into a plurality of communities based on a first traversability score and a second traversability score of one or more edges disposed between each node of the plurality of nodes, wherein each community from among the plurality of communities includes a set of nodes from among the plurality of nodes, and wherein the first traversability score is indicative of a traversability of a carrier robot along each edge of the one or more edges and the second traversability score is indicative of a traversability of a drone along each edge of the one or more edges;
identifying a plurality of community centroids based on the plurality of communities, wherein each community centroid from among the plurality of community centroids corresponds to a respective community from among the plurality of communities;
determining, for each community centroid from among the plurality of community centroids, a community type based on a distance between the community centroid and one or more charging stations;

generating a plurality of intercommunity routes based on the plurality of community centroids, the one or more charging stations, the community type, and one or more performance constraints; and deploying the carrier robot or the drone to move according to the plurality of intercommunity routes and to perform a surveying routine about the plurality of intercommunity routes, wherein the carrier robot is deployed in response to a value of the first traversability score exceeding a value of the second traversability score, and wherein the drone is deployed in response to the value of the second traversability score exceeding the value of the first traversability score.

15. The system of claim 14, wherein the instructions further comprise:

for each community centroid of the plurality of community centroids:

selecting a first charging station and a second charging station from among the one or more charging stations;

determining a first distance between the first charging station and the community centroid; and determining a second distance between the second charging station and the community centroid, wherein the community type of the community centroid is further based on a ratio between the first distance and the second distance.

16. The system of claim 14, wherein the instructions for generating the plurality of intercommunity routes based on the plurality of community centroids, the one or more charging stations, the community type, and the one or more performance constraints further comprise:

selecting a first charging station from among the one or more charging stations;

selecting a first set of community centroids from among the plurality of community centroids, wherein each community centroid from among the first set of community centroids is a primary type, and wherein a distance between the first set of community centroids and the first charging station is less than a distance between the first set of community centroids and a second charging station from among the one or more charging stations;

selecting a first community centroid from among the first set of community centroids, wherein a distance between the first community centroid and the first charging station is greater than a distance between each remaining community centroid of the first set of community centroids and the first charging station; and assigning the first community centroid to a first intercommunity route from among the plurality of intercommunity routes when an energy consumption of the first community centroid and an intracommunity time of the first community centroid satisfy the one or more performance constraints.

17. The system of claim 16, wherein the instructions further comprise:

selecting a second community centroid from among the first set of community centroids;

assigning the second community centroid to the first intercommunity route when an energy consumption of the second community centroid, an intracommunity time of the second community centroid, and an intercommunity time of the first community centroid and the second community centroid satisfy the one or more performance constraints.

18. The system of claim 14, wherein the instructions further comprise selectively assigning an auxiliary set of community centroids from among the plurality of community centroids to the plurality of intercommunity routes, wherein each community centroid from among the auxiliary set of community centroids is an auxiliary type.

19. The system of claim 18, wherein the instructions for selectively assigning the auxiliary set of community centroids from among the plurality of community centroids to the plurality of intercommunity routes further comprise:

for each community centroid from among the auxiliary set of community centroids:

determining whether one or more intercommunity routes from among the plurality of intercommunity routes are available based on an energy consumption of the community centroid and an intercommunity time of the community centroid; and in response to the one or more intercommunity routes being available, assigning the community centroid to a given intercommunity route from among the one or more intercommunity routes based on a distance between the community centroid and the one or more intercommunity routes.

20. The system of claim 19, wherein the instructions further comprise:

for each community centroid from among the auxiliary set of community centroids:

generating an additional route based on the community centroid and the one or more charging stations in response to the one or more intercommunity routes not being available.

* * * * *